(12) United States Patent
Yao

(10) Patent No.: US 8,528,885 B2
(45) Date of Patent: Sep. 10, 2013

(54) MULTI-STAGE SPRING SYSTEM

(75) Inventor: Jun Jason Yao, San Ramon, CA (US)

(73) Assignee: FormFactor, Inc., Livermore, CA (US)

( * ) Notice: Subject to any disclaimer, the term of this patent is extended or adjusted under 35 U.S.C. 154(b) by 1346 days.

(21) Appl. No.: 12/106,369

(22) Filed: Apr. 21, 2008

(65) Prior Publication Data
US 2009/0261517 A1 Oct. 22, 2009

(51) Int. Cl.
*F16F 1/18* (2006.01)

(52) U.S. Cl.
USPC ............................................... 267/160

(58) Field of Classification Search
USPC .................. 267/160, 158, 165, 185; 439/66
See application file for complete search history.

(56) References Cited

U.S. PATENT DOCUMENTS

| | | | |
|---|---|---|---|
| 4,622,514 A | 11/1986 | Lewis | |
| 5,214,375 A | 5/1993 | Ikeuchi et al. | |
| 6,246,247 B1 | 6/2001 | Eldridge et al. | |
| 6,268,015 B1 * | 7/2001 | Mathieu et al. | 430/313 |
| 6,384,734 B1 | 5/2002 | Ohno et al. | |
| 6,509,751 B1 | 1/2003 | Mathieu et al. | |
| 6,624,648 B2 | 9/2003 | Eldridge et al. | |
| 6,672,875 B1 | 1/2004 | Mathieu et al. | |
| 6,784,657 B2 | 8/2004 | Fujishiro et al. | |
| 6,784,678 B2 | 8/2004 | Pietzschmann | |
| 6,811,406 B2 | 11/2004 | Grube | |
| 6,841,991 B2 | 1/2005 | Martin et al. | |
| 7,074,072 B2 | 7/2006 | Huebner | |
| 7,524,194 B2 | 4/2009 | Eldridge et al. | |
| 7,688,085 B2 | 3/2010 | Gritters | |
| 7,825,675 B2 | 11/2010 | Breinlinger | |
| 2002/0024354 A1 | 2/2002 | Pietzschmann | |
| 2002/0067181 A1 | 6/2002 | Eldridge et al. | |
| 2003/0199179 A1 | 10/2003 | Dozier, II et al. | |
| 2004/0113640 A1 | 6/2004 | Cooper | |
| 2004/0266089 A1 | 12/2004 | Mathieu et al. | |
| 2005/0179458 A1 * | 8/2005 | Chen et al. | 324/762 |
| 2006/0043975 A1 | 3/2006 | Eldridge | |
| 2006/0043985 A1 | 3/2006 | Eldridge | |
| 2007/0040312 A1 * | 2/2007 | Sugar et al. | 267/160 |
| 2009/0237099 A1 | 9/2009 | Garabedian et al. | |
| 2011/0169516 A1 | 7/2011 | McFarland | |

OTHER PUBLICATIONS

A. Carella, A Passive Vibration Isolator Incorporating A Composite Bistable Plate, Article, Department of Aerospace Engineering, University of Bristol, UK, 4 pages, 2008.
epp-online.de, For Parallel-Dice and Full Arrays, website, Jul. 31, 2009.
U.S. Appl. No. 09/527,931, filed Mar. 17, 2007, Mathieu et al.

* cited by examiner

*Primary Examiner* — Xuan Lan Nguyen
(74) *Attorney, Agent, or Firm* — Kirton McConkie

(57) ABSTRACT

Embodiments of a multi-stage spring system are provided herein. In some embodiments, a multi-stage spring system includes a spring assembly having at least one resilient element, wherein the spring assembly has a first spring constant when deflected up to a first distance, a greater, second spring constant when deflected beyond the first distance and up to a second distance, and a greater, third spring constant when deflected beyond the second distance and up to a third distance, and wherein the spring assembly stores mechanical energy when deflected towards a contact surface that biases the spring assembly away from the contact surface when released.

22 Claims, 6 Drawing Sheets

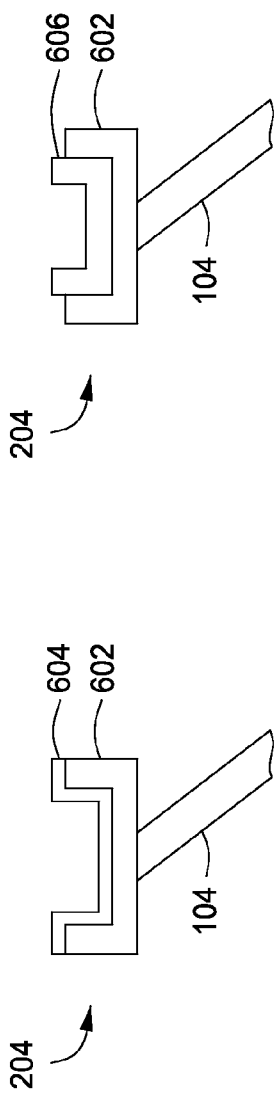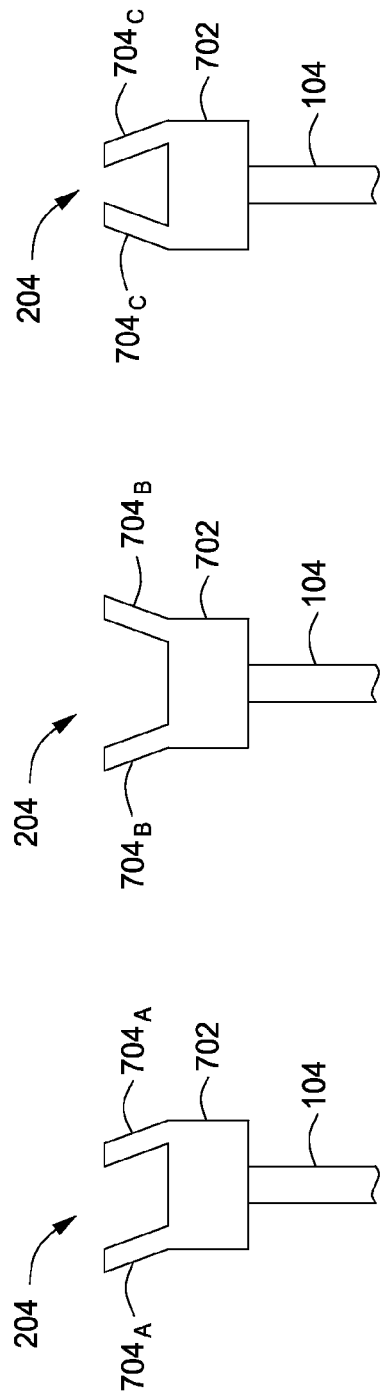

MULTI-STAGE SPRING SYSTEM

BACKGROUND OF THE INVENTION

1. Field of the Invention

The present invention relates to microspring systems.

2. Description of the Related Art

Many systems, such as semiconductor testing systems, electronic circuits, micro electromechanical systems (MEMS), and the like (as non-limiting examples), often utilize switches to selectively make contacts to route electrical signals through the systems to facilitate the use and control thereof. Such switches may utilize springs or spring systems as a part of the switch.

For example, many conventional MEMS switch designs use a parallel-plate electrostatic actuator to drive the switch and linear spring systems with a constant k-value to provide a restoring force for assisting in overcoming any contact stiction that may occur between the parallel plates of the actuator and/or the switch and the contacts that the switch engages upon closing. The linear spring must be made with a k value that is low enough to accommodate the low electrostatic force that is initially generated when the parallel-plate gap is large (e.g., to allow the switch to begin to close). As the gap reduces, the electrostatic force between the parallel plates increases. However, the mechanical restoring force due to the linear spring only increases at a linear rate due to the constant k-value. This results in a low mechanical restoring force, which presents a major problem in contact-breaking for such a MEMS switching device.

Thus, there is a need for an improved spring system.

SUMMARY OF THE INVENTION

Embodiments of a multi-stage spring system are provided herein. In some embodiments, a multi-stage spring system includes a spring assembly having at least one resilient element, wherein the spring assembly has a first spring constant when deflected up to a first distance, a greater, second spring constant when deflected beyond the first distance and up to a second distance, and a greater, third spring constant when deflected beyond the second distance and up to a third distance, and wherein the spring assembly stores mechanical energy when deflected towards the contact surface that biases the spring assembly away from the contact surface when released.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 6A-B depict non-limiting examples of contacts suitable for use with multi-stage springs in accordance with some embodiments of the invention.

FIGS. 7A-C depict non-limiting examples of tips suitable for use with multi-stage springs in accordance with some embodiments of the invention.

Where possible, identical reference numerals are used herein to designate elements that are common to the figures. The images used in the drawings are simplified for illustrative purposes and are not depicted to scale.

DETAILED DESCRIPTION

Figure 1A:
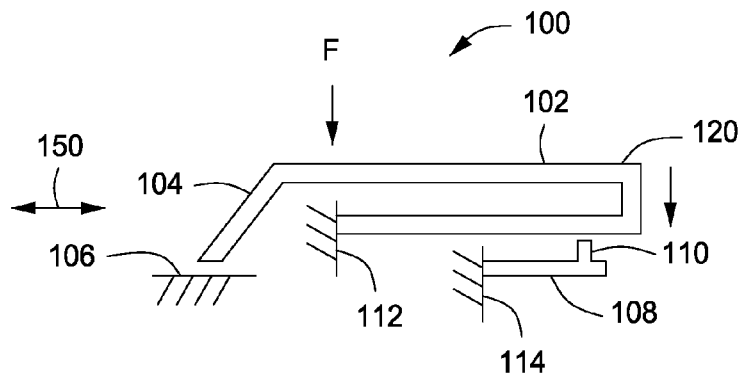
FIGS. 1A-B depict schematic side views of multi-stage springs in accordance with some embodiments of the present invention.

This specification describes exemplary embodiments and applications of the invention. The invention, however, is not limited to these exemplary embodiments and applications or to the manner in which the exemplary embodiments and applications operate or are described herein. Moreover, the Figures may show simplified or partial views, and the dimensions of elements in the Figures may be exaggerated or otherwise not in proportion for clarity. In addition, as the terms "on" and "attached to" are used herein, one object (e.g., a material, a layer, a substrate, etc.) can be "on" or "attached to" another object regardless of whether the one object is directly on or attached to the other object or there are one or more intervening objects between the one object and the other object. Also, directions (e.g., above, below, top, bottom, side, up, down, "x," "y," "z," etc.), if provided, are relative and provided solely by way of example and for ease of illustration and discussion and not by way of limitation. In addition, where reference is made to a list of elements (e.g., elements a, b, c), such reference is intended to include any one or more of the listed elements.

Embodiments of the present invention include multi-stage spring systems that provide variable spring compliance to shape the mechanical characteristics of the spring system. Such multi-stage spring systems may advantageously provide an increased restoring force for assisting in overcoming any contact stiction that may occur between the contacts that the switch engages upon closing as compared to conventional spring systems. For example, conventional spring systems are typically linear and have a k value that is low enough to accommodate the low electrostatic force that is initially generated when used with electrostatic actuators (e.g., to allow the switch to begin to close when the gap between the electrodes of the electrostatic actuator is large). In addition, such multi-stage systems may further facilitate storing restoring forces that may increase as a function of the reduction in the gap between electrodes of an electrostatic actuator (which increases the electrostatic force between the electrodes), thereby further facilitating overcoming any contact stiction that may develop between the electrodes and/or the contacts of the switch (as compared to conventional systems having low, constant mechanical restoring forces due to the linear spring resulting in lesser ability of contact-breaking for a MEMS switching device utilizing such conventional spring systems).

In some embodiments, the mechanical characteristics of the spring system may be shaped to conform to forces applied by an actuating means coupled to the multi-stage spring system. The multi-stage spring system may offer different compliant levels at different deflection locations. In a non-limiting example, the multi-stage spring system may be utilized to provide a compact, high-density, low-voltage MEMS switch. For example, the multi-stage spring system can be used as part of, or in conjunction with, a MEMS electrostatic actuator for various applications, including RF switches. The multi-stage spring system may advantageously provide higher contact-breaking forces as compared to conventional designs in such a MEMS switching device, or other applications as well.

The multi-stage spring systems disclosed herein may sometimes be referred to as multi-stage springs or multi-stage spring assemblies. In some embodiments, the multi-stage spring (or multi-stage spring assembly) may include a plurality of spring elements for providing varying spring constants (k values) corresponding to varying quantities, or distances, of deflection of the spring. As such, the multi-stage spring assembly may have a first spring constant when deflected up to a first distance (e.g., a first stage), a greater, second spring constant when deflected beyond the first distance and up to a second distance (e.g., a second stage), and a greater, third spring constant when deflected beyond the second distance and up to a third distance (e.g., a third stage), and so on for embodiments having greater numbers of spring elements or stages. Each individual stage of the multi-stage spring may have any desired k value such that the total k value at each stage and over the entire range of movement of the multi-stage spring may be controlled as desired. The multi-stage springs in accordance with the various embodiments disclosed herein may have greater or fewer spring elements than those illustratively shown. The Figures and embodiments described herein illustrate only exemplary multi-stage springs, and other configurations are possible that fall within the scope of the described invention.

FIG. 1A depicts a schematic side view of a multi-stage spring 100 in accordance with some embodiments in the present invention. In the embodiment depicted in FIG. 1A, the multi-stage spring 100 includes a first spring element 102, a second spring element 108, and a third spring element 104. The spring elements may take any suitable form such as simple, or linear (e.g., such as second spring element 108), complex, or non-linear (e.g., such as first spring element 102), curved, combinations of the above, or the like. The spring elements may be anchored at any desired location (as illustratively shown by hash marks in FIG. 1A at 112 and 114) to provide the relative movement of the respective spring elements and the engagement thereof during operation.

The various spring elements (e.g., 102, 104, 108 in the embodiment depicted in FIG. 1A) of the multi-stage spring may be configured to be at least partially sequentially engaged upon deflection of a first spring element in order to provide increasing k values for the multi-stage spring as a whole as the first spring element travels across an increasing range of deflection. The deflection of the respective spring elements may be controlled via application of a force (depicted in the Figures herein as an arrow labeled "F" for illustration) to the multi-stage spring. Such a force may be provided by single or composite sources (such as by one or more of the actuators described herein) and is only illustratively shown in the Figures. The force may be applied at any suitable location and in any suitable direction to provide the desired motion (e.g., deflection) of the respective spring elements of the multi-stage spring. For example, although shown in a single location in FIGS. 8A-C, the force F may be applied at different locations, or at multiple locations, anywhere on the multi-stage spring to provide the desired motion of the respective spring elements of the multi-stage spring. The multi-stage spring assembly stores mechanical energy when deflected towards a contact surface that biases the spring assembly away from the contact surface when released.

For example, in some embodiments and as depicted in FIG. 1A, the second spring element 108 may be configured to be engaged upon a desired quantity of deflection of the first spring element 102 (e.g., the force applied to the first spring element 102 may cause a downward deflection of the first spring element 102, including at an end 120 of the first spring element 102, thereby causing the first spring element 102 to contact the second spring element 108). The second spring element 108 may have an extension 110 or other feature that engages the first spring element 102 after a desired quantity of deflection of the first spring element 102. The extension 110, or other feature, may be configured to define a small gap between the first spring element 102 and the second spring element 108 such that the second spring element 108 is engaged upon the desired quantity of deflection of the first spring element 102. In operation, the first spring element 102 initially provides the multi-stage spring 100 with an initial k value (k1). Upon engaging the second spring element 108 (or the extension 110), a second k value (k2) for the multi-stage spring 100 is provided. The second k value will be equal to an increased k value of the first spring element 102 (due to its effective shortening) plus the k value of the second spring element 108.

The third spring element 104 may be configured to be engaged upon a second quantity of deflection of the first spring element 102 beyond the first quantity of deflection (e.g., after a desired quantity of deflection after engagement of the second spring element 108). Thus, a third k value (k3) for the multi-stage spring 100 may be provided upon engagement of the third spring element 104. Each spring element may be configured to provide an increase in the k value of the multi-stage spring as desired for a particular application (including greater of fewer stages, varying ranges of deflection for individual stages and/or for the multi-stage spring as a whole, or the like).

In some embodiments, the third spring element 104 may engage a contact surface of a member 106. A portion of the third spring element 104 (or whichever final spring element ultimately engages the member 106) may be configured to wipe the member 106, as shown by arrows 150 (e.g., the portion of the third spring element 104 that contacts the member 106 may be configured to move with respect to the contact surface of the member 106 as the deflection increases and decreases to "wipe" the contact surface of the member 106.) The wiping, and subsequent unwiping motion upon retraction of the multi-stage spring 100, may facilitate overcoming any contact stiction between the member 106 and the portion of the third spring element 104 that contacts the member 106. The wiping motion may further facilitate breaking through any oxide layer or particles or other contaminants that may exist between the member 106 and the portion of the third spring element 104 that contacts the member 106, which may improve the operation of the switch (e.g., signal quality for electrical applications, switch lifetime, or the like).

In some embodiments, the spring element configured to wipe the member 106 may be angled with respect to the member 106 to provide the wipe. Although the third spring element 104 depicted in FIG. 1A is shown at an about 45 degree angle with respect to the member 106, other angles may be utilized to facilitate control of the k value provided by the spring element and/or control of the amount of travel of the spring element when deflected beyond initial contact with the member 106 (e.g., to control the amount of wipe provided).

In some embodiments, as shown in FIG. 1A, the member 106 may be a separate component that is disposed with respect to the multi-stage spring 100 to facilitate contact of the third spring element 104 (or a subsequent spring in embodiments with greater numbers of spring elements) upon a desired quantity of deflection of the multi-stage spring 100. In some embodiments (not shown), the member 106 may be part of the multi-stage spring 100.

The quantity of deflection of the multi-stage spring 100, or of the first spring element 102, may be controlled via application of a force (indicated by arrow F in FIG. 1A) to deflect the first spring element 102. The magnitude of the force applied may be selectively controlled to provide a desired quantity of deflection given the design of the multi-stage spring and the varying stages of k values provided by the multi-stage spring assembly as it deflects. The force may be applied via any suitable mechanism, such as an actuator. In some embodiments, the force may be applied by a MEMS actuator as discussed in more detail below. Although shown as being applied proximate a distal end of the first spring element 102, the force may be applied at any suitable location of the multi-stage spring 100 for inducing deflection of the first spring element 102.

Figure 1B:
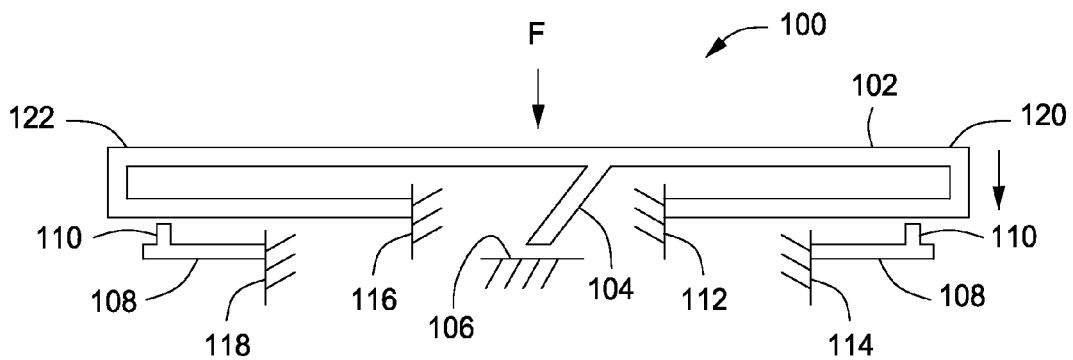

Embodiments of the multi-stage spring disclosed herein may have various forms. For example, the number of spring elements and/or stages of the multi-stage spring may be selected as desired to control the k value of the multi-stage spring, and thereby to increase the stored mechanical energy upon deflection of the multi-stage spring. For example, FIG. 1B illustrates embodiments of the multi-stage spring 100 wherein the spring elements have a different configuration. Specifically, as shown in FIG. 1B, the first spring element 102 of the multi-stage spring 100 may be anchored at two points (112, 116) and may be configured to deflect upon application of a force, F, to a central location (or any other suitable location or locations) on the first spring element 102. A pair of second spring elements 108 may be provided to be engaged upon a desired quantity of deflection of the first spring element 102 (e.g., as respective ends 120, 122 of the first spring element 102 deflect toward the second spring elements 108). A third spring element 104 may be provided for being engaged upon a desired continued amount of deflection of the first spring element 102. The configuration shown in FIGS. 1A and 1B are illustrative only and, as discussed above, many other configurations are contemplated.

In addition, the multi-stage spring may be utilized in various applications, such as electrical systems, mechanical systems, electromechanical systems, or the like. For example, a multi-stage spring in accordance with embodiments of the present invention may be utilized as a resilient contact element for making selective temporary electrical pressure contacts with a contact element. A non-limiting example of one such use may be illustrated using a multi-stage spring as shown in FIGS. 1A-B, wherein the member 106 may provide a first conductive path and the first spring element 102 and the third spring element 104, or portions thereof, may provide a second conductive path for making selective contact with the member 106 upon sufficient deflection of the first spring element 102 (and thereby, the third spring element 104). The second electrically conductive path may be insulated from the first electrically conductive path when the third spring element 104 is not in contact with the member 106. Accordingly, the multi-stage spring 100 may be utilized as a switch for selectively making electrical contacts (e.g., between the third spring element 104 and the member 106).

Figure 2:
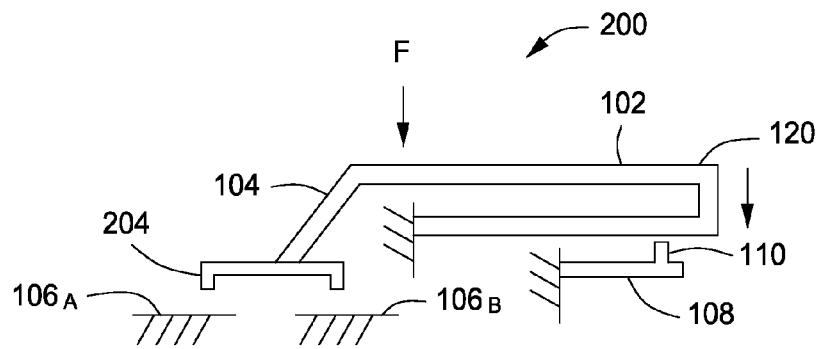
FIG. 2 depicts a schematic side view of a multi-stage spring in accordance with some embodiments of the present invention.

In some embodiments, as shown in FIG. 2, a multi-stage spring 200 may be provided for making selective contact between a contact surface of a first member $106_A$ and a contact surface of a second member $106_B$. In some embodiments, such contact may be utilized to provide an electrical switch. For example, the first member $106_A$ and the second member $106_B$ may be at least partially fabricated from one or more electrically conductive materials to provide an electrical pathway that is open when the switch is open (e.g., when the multi-stage spring is relaxed.) The multi-stage spring 200 may be similar to the multi-stage spring 100 described in FIGS. 1A-B with the addition of a tip 204 disposed on the third spring element 104 (or whichever ultimate spring element is desired to make contact with the members $106_{A-B}$.). The tip 204 may be configured to contact both members $106_{A-B}$ upon sufficient deflection of the multi-stage spring 200. In some embodiments, the tip 204 may also be configured to wipe both members $106_{A-B}$ upon deflection of the multi-stage spring 200 beyond initial contact with the members $106_{A-B}$.

In embodiments where electrical contact is desired, the tip 204 may be fabricated from one or more conductive materials, may be coated with one or more conductive materials, or may have an electrically conductive portion coupled to the tip 204. For example, FIG. 6A depicts an illustrative schematic side view of a tip 204 in accordance with some embodiments of the invention. In the embodiment shown in FIG. 6A, the tip 204 includes a base 602 disposed at an end of the third spring element 104. The tip 204 further includes a conductive portion 604 configured to contact both members $106_{A-B}$ (shown in FIG. 2). The conductive portion 604 may be a conductive coating (such as a deposited or plated coating), a thin sheet or foil that may be coupled to the base 602, a thin conductive plate that is machined or bent to correspond to the geometry of the base 602, or like material and configuration suitable for conducting electrical current in a desired application. In some embodiments, as shown in FIG. 6B, a conductive portion 606 configured to contact both members $106_{A-B}$ may be disposed in a corresponding recess in the base 602. The conductive portion 606 may comprise one or more pieces of conductive material that is machined or otherwise formed into a desired shape suitable for contacting members $106_{A-B}$. The geometry of the tip 204 (including the base 602, the conductive portion 604, and/or the conductive portion 606) shown herein is illustrative only and other geometries are contemplated for either or both of the contact and non-contact portions of the tip 204, such as curves, chevrons (vees), or the like.

In some embodiments, the wipe of the members by the multi-stage spring may be provided by elements other than the final spring element of the multi-stage spring. For example, in some embodiments, the tip 204 may be disposed at an end of a spring element (such as the third spring element 104) that is not configured to wipe the members $106_{A-B}$ (shown in FIG. 2) upon continued deflection past initial contact therewith. In some embodiments, the tip 204 itself may be configured to provide the desired wipe motion. For example, FIGS. 7A-C depict non-limiting examples of tips 204 suitable for use with multi-stage springs in accordance with some embodiments of the invention. In embodiments represented by FIG. 7A, the tip 204 may include a base 702 having two contacts $704_A$ that are each angled with respect to the respective member $106_{A-B}$ with which the contact $704_A$ will engage. Similarly, as shown in FIG. 7B, the base 702 may include two contacts 704$_B$ that are angled in outwardly opposing directions. In some embodiments, as shown in FIG. 7C, the base 702 may include two contacts 704$_C$ that are angled in inwardly opposing directions. In some embodiments, the non-limiting examples of tip configurations shown in FIGS. 7A-C may be combined with the non-limiting examples of the contacts depicted in FIGS. 6A-B. It is contemplated that still other combinations of tip configurations, contacts, and spring configurations may also be utilized to provide a multi-stage spring in accordance with the teachings of the present invention.

Figure 8A:
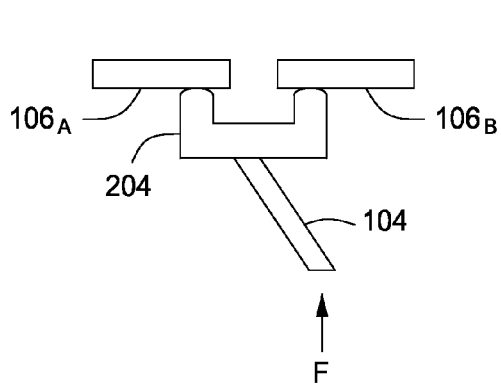
FIGS. 8A-B depict stages of operation of a multi-stage spring having a tip configuration in accordance with some embodiments of the present invention.
Figure 8B:
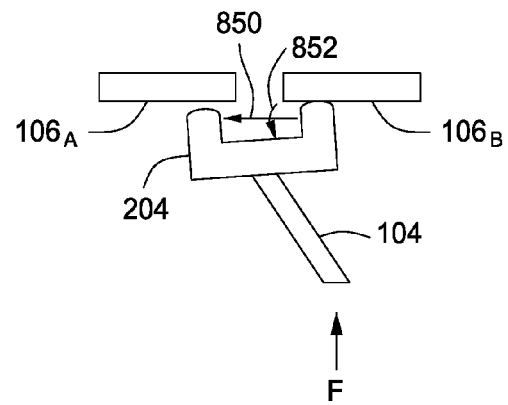

In some embodiments, the multi-stage spring may have a tip configuration that may provide more even contact between multiple contact points (such as between a tip similar to the tip 204 and members 106$_{A-B}$). For example, in some embodiments, and as depicted in FIG. 8A, the tip 204 of the multi-stage spring (such as in embodiments similar to FIG. 2) may initially come into contact with the members 106$_{A-B}$ substantially concurrently, or the tip 204 may provide substantially equal pressure against both members when a force, F, is applied to the multi-stage spring to cause it to come into contact with the members 106$_{A-B}$. As the force is increased, or as the wiping movement begins, increasingly higher contact force will be applied on member 106$_B$, and less on member 106$_A$ as the entire tip 204 wipes and rotates (as shown by arrows 850, 852), thereby causing contact resistance variation between the members 106$_{A-B}$. In some embodiments, and as depicted in FIG. 8B, the tip 204 may rotate sufficiently to disengage, or lose contact with, member 106$_A$.

Figure 9A:
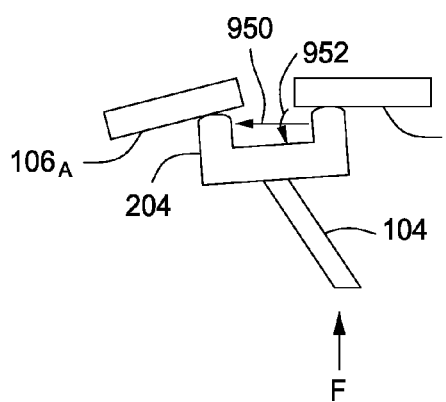
FIGS. 9A-C respectively depict various tip configurations of a multi-stage spring in accordance with some embodiments of the present invention.
Figure 9B:
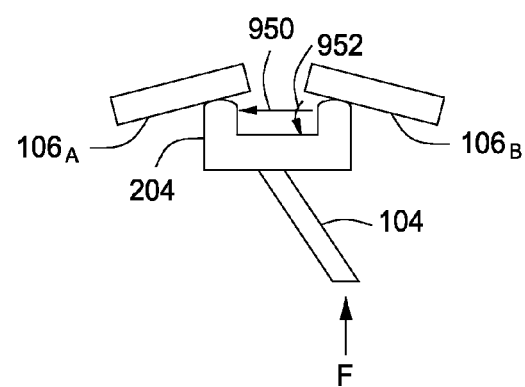

In some embodiments, one or more of the tip 204, the member 106$_A$, and/or the member 106$_B$ may be configured to compensate for the wipe and/or rotation of the tip 204 (as shown by arrows 950, 952). For example, in some embodiments, and as shown in FIG. 9A, the member 106$_A$ may be provided at an angle configured to account for the rotation of the tip 204, which may facilitate making the resultant contact forces more even between the two members 106$_{A-B}$. In some embodiments, and as shown in FIG. 9B, both members 106$_{A-B}$ may be provided at an angle configured to account for the rotation of the tip 204. Providing the member 106$_A$ (as shown in FIG. 9A) or both members 106$_{A-B}$ (as shown in FIG. 9B) at an angle may also advantageously facilitate keeping even contact along the surface of the members 106$_{A-B}$ as the tip 204 provides wipe of the respective surfaces of the members 106$_{A-B}$.

Figure 9C:
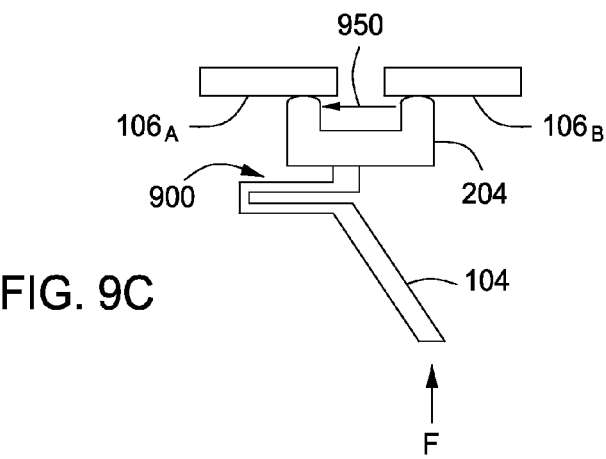

Alternatively or in combination with the above, in some embodiments, a mechanism may be provided to facilitate rotation, or pivoting, of the tip 204 (and/or one or more of the members 106$_{A-B}$) while maintaining relatively even contact pressure between the tip 204 and the members 106$_{A-B}$ as the tip 204 wipes the members 106$_{A-B}$ (as shown by arrow 950). Examples of suitable mechanisms include hinges, flexures, springs, or the like. In some embodiments, the k value, if any, of the mechanism may provide an additional stage in the range of movement of the multi-stage spring (e.g., the multi-stage spring while have a certain cumulative k value before and after engagement of the mechanism). The mechanism may be provided at any suitable location in the multistage spring or in the members. For example, in some embodiments, and as depicted in FIG. 9C, a spring 900 may be provided to facilitate rotation of the tip 204 and maintain more even contact pressure between the tip 204 and the members 106$_{A-B}$. Although shown disposed in the third spring element 104, the spring 900 (or other mechanism) may be disposed in other locations as well, such as in the tip 204, in one or more of the members 106$_{A-B}$, or the like.

The components, or elements, of the multi-stage spring assemblies disclosed herein may be fabricated from any suitable materials that may provide the desired characteristics for which the various assembly components provide. For example, the spring elements may be fabricated from materials providing the desired k values and range of motion of the individual spring elements without damaging the assembly. In addition, where the multi-stage spring assemblies are used to make electrical contacts, such as in switching applications, the multi-stage spring assembly may be at least partially fabricated from (including coated with) suitable conductive materials, such as metals, noble metals, or semi-noble metals (e.g., copper, aluminum, gold, rhodium, palladium, alloys thereof, or the like). For example, in some embodiments, the multi-stage spring assembly may be at least partially fabricated from silicon, or in some embodiments, single crystal silicon. In some embodiments, the multi-stage spring assembly may be lithographically fabricated from silicon. In some embodiments, the multi-stage spring assembly may be partially lithographically fabricated from silicon and the tip (e.g., 104, 204) may be formed from a metal by a suitable process, such as plating, or the like.

As described above with respect to FIGS. 1A-B and 2, multi-stage springs in accordance with embodiments of the invention may provide stages of increasing k values over a desired range of deflections of the multi-stage spring. Such incremental increases in k values at desired stages of deflection of the spring may advantageously be utilized to store increased quantities of mechanical energy in the multi-stage spring assembly when the force applied to actuate the multi-stage spring is increases exponentially. Such exponentially increasing forces may be obtained when using, in a non-limiting example, a gap closing electrostatic actuator to apply the force to drive the spring.

Figure 3:
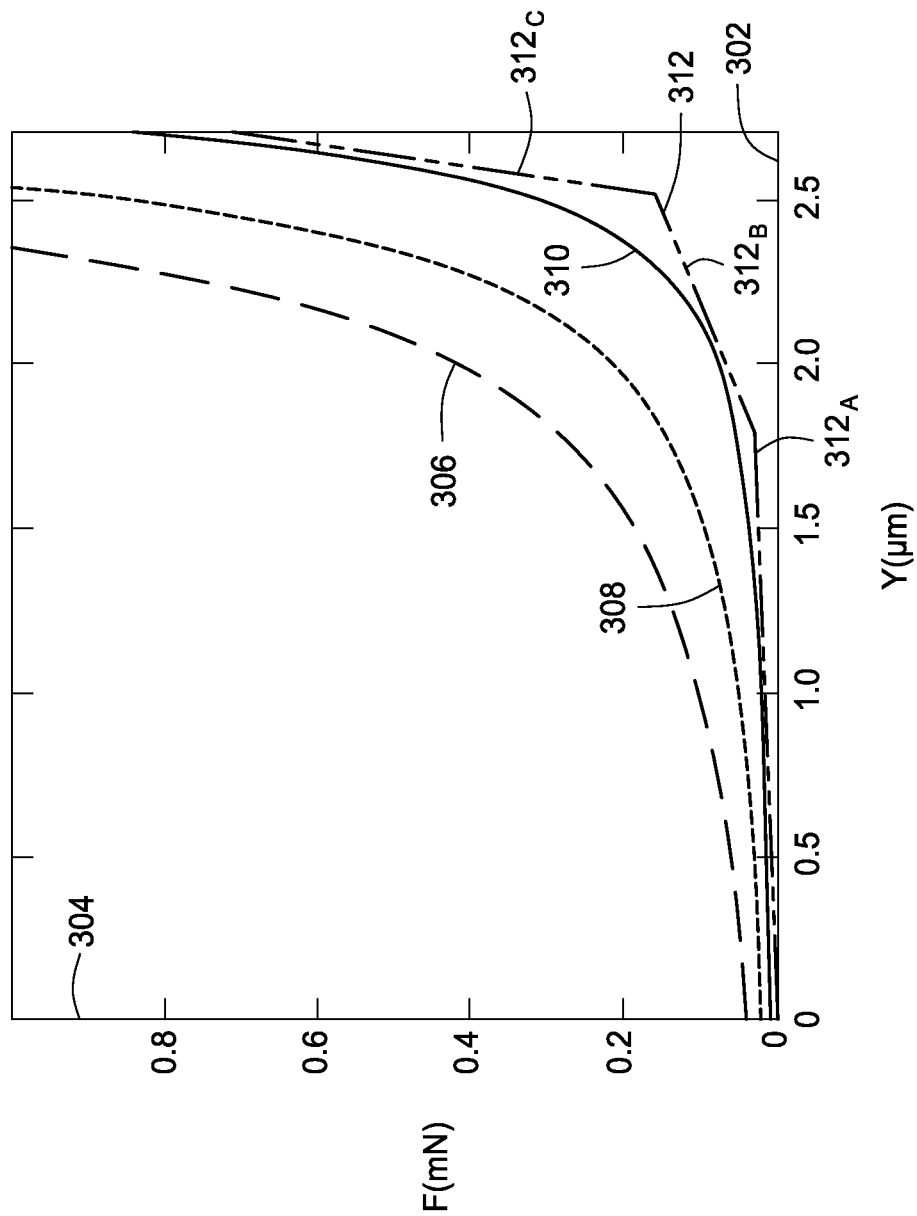
FIG. 3 depicts a graph showing force versus distance traveled for a multi-stage spring in accordance with some embodiments of the invention.

For example, FIG. 3 depicts a graph showing the force in millinewtons (axis 304) versus the distance traveled, y, in micrometers (axis 302) for an electrostatic actuator having a variety of voltages applied (a first voltage shown by 306, a second voltage shown by 308, and a third voltage shown by 310) and an exemplary multi-stage spring assembly (312). As shown by lines 306, 308, and 310 the electrostatic force generated by a gap-closing actuator increases exponentially as the gap closes (e.g., as the actuator moves a longer distance as the electrodes approach a closed position).

As shown illustratively with respect to line 310, the mechanical force generated, or stored as potential energy within the multi-stage spring, may be advantageously made to more closely follow the curve of the electrostatic force generated by the actuator (e.g., line 310 in this illustration). For example, a portion 312$_A$ corresponds to the deflection of a first stage or spring element, portion 312$_B$ corresponds to the engagement of a second stage or spring element, and portion 312$_C$ corresponds to the engagement of a third stage or spring element. As can be readily seen from extension of the portion 312$_A$, a spring or spring assembly having a linear k value over the desired range of travel would generate and store much less energy within the spring.

The line 312 shown in FIG. 3 is illustrative of some embodiments of a multi-stage spring. Greater numbers of stages or spring elements may be implemented in a multi-stage spring in order to more closely follow the curve of the actuator force applied over the same range of travel (e.g., to more closely trace the force applied by the actuator). Thus, the multi-stage spring may provide a significant advantage as compared to single-stage linear springs conventionally used with electrostatic gap-closing actuators—embodiments of multi-stage springs as disclosed herein may advantageously store a greater magnitude of restoring force to facilitate overcoming contact stiction between contacts, for example, when used in switching applications.

As discussed above, the multi-stage spring assemblies in accordance with some embodiments of the invention may be utilized with an actuator to control the operation thereof (e.g., to control the deflection of the multi-stage spring). Examples of suitable actuators may be electrically, mechanically, or electromechanically driven and may vary in size to suit the application. In some embodiments, the actuator may be a micro-electromechanical system (MEMS) device, such as an electrostatic gap closing actuator, a comb drive, combinations thereof, or the like. Non-limiting examples of suitable MEMS actuators, such as electrostatic gap closing actuators, comb drives, angled gap closing actuators, partitioned MEMS actuators, or multistage MEMS actuators, may be found in U.S. patent application Ser. No. 12/106,364, filed Apr. 21, 2008, and entitled, "Switch for use in Microelectromechanical Systems (MEMS) and MEMS Devices Incorporating Same," which is hereby incorporated by reference in its entirety.

Figure 4:
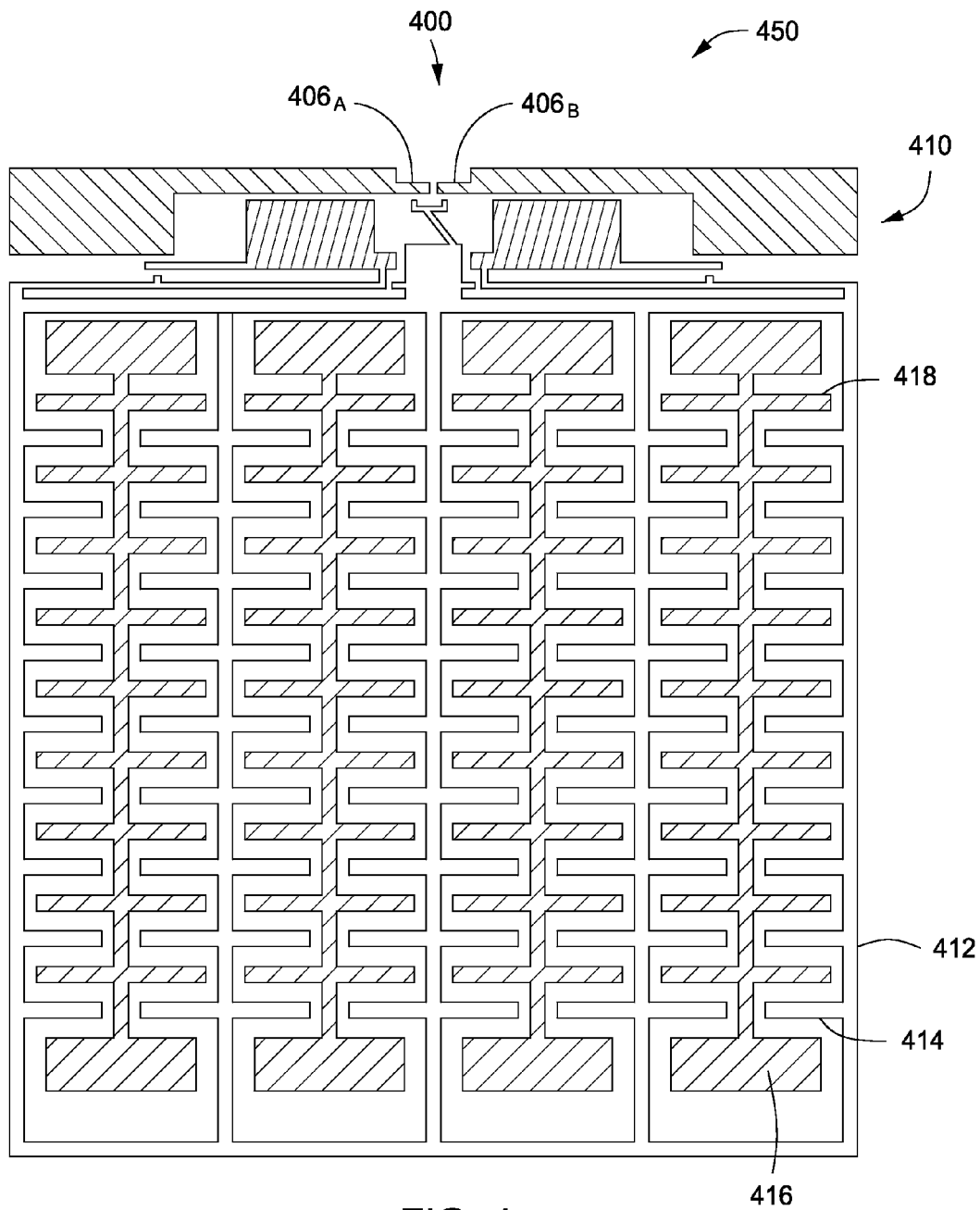
FIG. 4 depicts a schematic top view of a MEMS switch having a multi-stage spring in accordance with some embodiments of the present invention.

For example, FIG. 4 depicts a schematic top view of a MEMS switch 450. The MEMS switch 450 includes a multi-stage spring 400 in accordance with some embodiments of the present invention coupled to an actuator 410 for controlling the deflection of the multi-stage spring 400 to selectively make contact with members $406_A$ and $406_B$. Control of the actuator 410 thereby controls operation of the MEMS switch 450 (e.g., the opening and/or closing of the MEMS switch 450).

In the embodiment shown in FIG. 4, the actuator 410 may illustratively be an electrostatic gap-closing actuator having a movable frame 412 for supporting a plurality of movable electrodes 414 coupled thereto. A fixed structure 416 may be provided for supporting a plurality of fixed electrodes 418 configured to interface with the movable electrodes 414. The fixed structure 416 may be disposed within the movable frame 412 or otherwise configured to support the fixed electrodes 418 in a desired position with respect to the movable electrodes 414.

The fixed electrodes 418 may be interleaved with and spaced apart from the movable electrodes 414. At rest, the fixed electrodes 418 and the movable electrodes 414 are disposed at a first distance from each other along their respective major axes, and at least slightly off-center with respect to the gap between any two adjacent pairs of fixed electrodes 418 or movable electrodes 414 (i.e., the gap between the long sides of the electrodes is at least slightly greater on one side of a respective electrode than the other to facilitate consistent directional movement of the movable electrodes 414 towards the nearer respective fixed electrode 418, and thereby, consistent directional movement of the actuator 410). Application of a voltage potential between the fixed electrodes 418 and the movable electrodes 414 causes the movable frame 412 and the movable electrodes 414 to move towards the fixed electrodes 418. In the embodiment depicted in FIG. 4, such motion is in an upwards direction. As the gap between the movable electrodes 414 and the fixed electrodes 418 decreases, the electrostatic attraction therebetween increases, thereby applying a greater force to the multi-stage spring 400 (as described with respect to FIG. 3, above).

A plurality of springs, for example at least partially provided by the multi-stage spring 400, may be utilized to store a mechanical restoring force that may facilitate overcoming any contact stiction that may exist between the movable and fixed electrodes 414, 418, and/or between the contacts being made with the switch (e.g., between the multi-stage spring 400 and the members $406_{A-B}$). Such restoring force facilitates returning the multi-stage spring 400, and the actuator 410 to a resting position (e.g., in the embodiment depicted in FIGS. 4 and 5, a position wherein the MEMS switch 450 is open).

Figure 5:
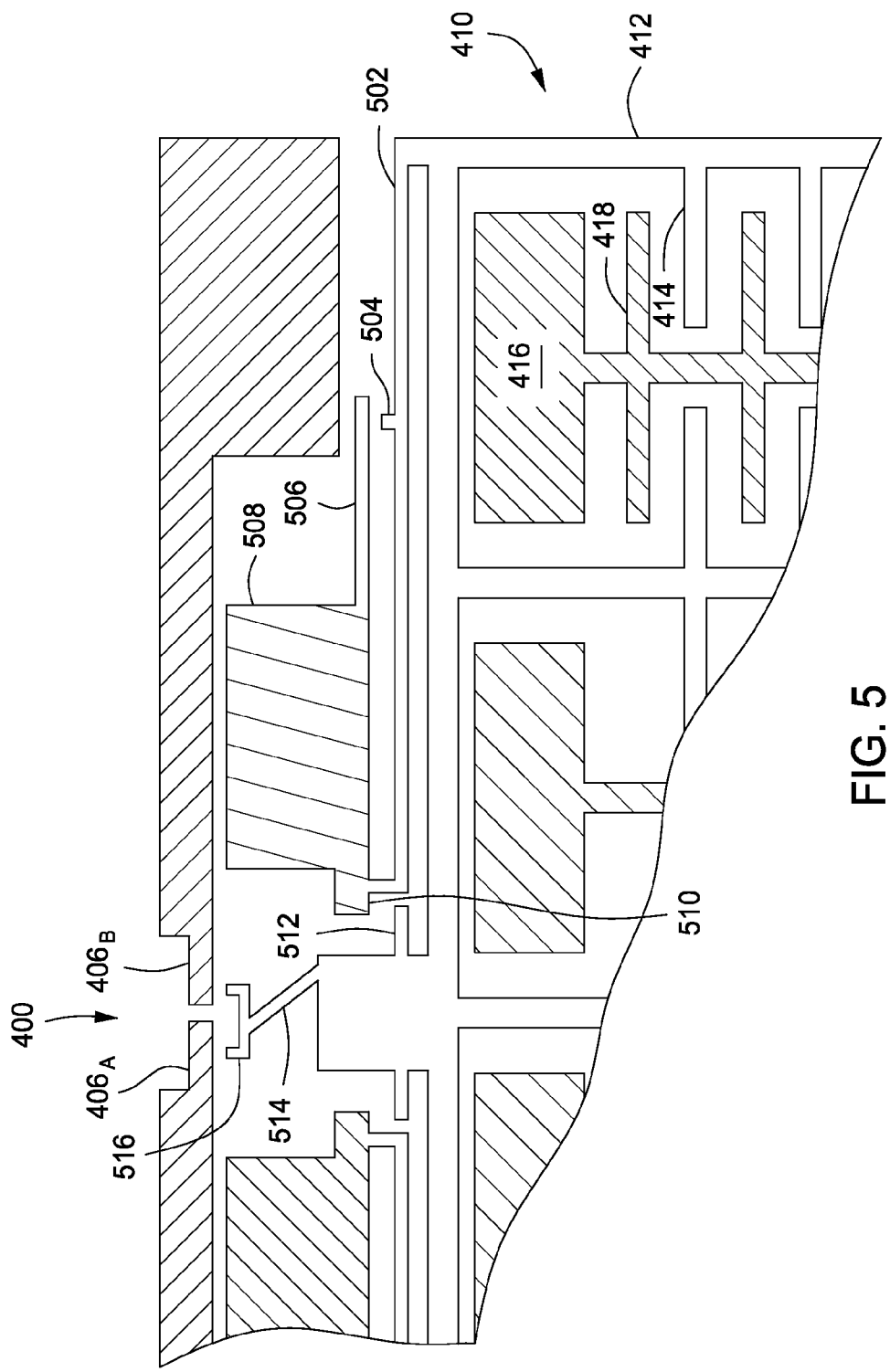
FIG. 5 depicts a close up view of portions of the multi-stage spring of FIG. 4.

For example, FIG. 5 depicts a close-up view of the illustrative multi-stage spring 400 shown in FIG. 4 that details illustrative numbers and positions of springs that may be utilized to store mechanical energy during actuation of the switch, as described above. As shown in FIG. 5, a first spring 502 may be coupled between the movable frames 412 of the actuator 410 and a fixed element 508 (although FIG. 5 depicts a symmetric arrangement of springs and fixed elements, the description is limited to one side of the Figure for ease of understanding).

The first spring 502 may be configured to interface with or engage with a second spring 506 upon a desired quantity of deflection of the first spring 502 (e.g., upon application of an actuation voltage to the actuator 410 to cause the actuator 410 to begin to move, the first spring 502 immediately begins to deflect and store mechanical energy and will engage with the second spring 506 after continuing to move for a certain distance). In some embodiments, a protrusion 504 may be provided to facilitate engaging the second spring 506. The protrusion 504 may be configured to define a desired gap between the protrusion 504 and the second spring 506 such that the second spring 506 will be engaged upon a desired quantity of deflection of the first spring 502. In the embodiment shown in FIG. 5, the second spring 506 is shown as an extension from the fixed member 508. However, it is contemplated that the second spring 506 may be coupled to a different fixed member or otherwise disposed in a desired location to provide the stages of operation as described herein.

Upon continued movement of the actuator 410, a third spring 514 may be engaged when a contact 516 disposed at a distal end thereof comes into contact with contacts $406_A$ and $406_B$ to close the switch. The third spring 514 may be configured to provide a wiping action between the contact 516 and the contacts $406_A$ and $406_B$ (e.g., a lateral movement therebetween) as the actuator 410 continues to move towards a closed position. The wiping, and subsequent unwiping motion upon retraction of the actuator 410 and thereby the multi-stage spring 400, may facilitate overcoming any contact stiction between the contact 516 and the elements $406_A$ and $406_B$. The wiping motion may further facilitate breaking through any oxide layer or particles or other contaminants that may exist between the contact 516 and the elements $406_A$ and $406_B$, which may improve the operation of the switch (e.g., signal quality, switch lifetime, or the like).

As the actuator 410 closes, the first spring 502 of the multi-stage spring 400 provides a first spring constant (k value) as the spring assembly is deflected up to a first distance (e.g., until the engagement of the second spring 506). Once engaged, the second spring 506 provides a greater, second spring constant (k value) when deflected beyond the first distance and up to a second distance (e.g., until the engagement of the third spring 514). Once the third spring 514 is engaged, a greater, third spring constant (k value) is provided as the multi-stage spring 400 is deflected beyond the second distance and up to a third distance.

The stored mechanical energy of the actuated multi-stage spring 400 biases the spring assembly in a direction away from the contact surface, thereby facilitating return of the multi-stage spring 400 to its resting position and helping to overcome any contact stiction that may exist between the contacts (e.g., between contact 516 and contacts 518a and 518b and/or between electrodes of the actuator 410).

In some embodiments, the multi-stage spring assembly may be configured to have a limited range of motion (e.g., by providing a stop or other mechanism for preventing excessive travel of the multi-stage spring). In some embodiments, the limited range of motion may facilitate preventing the moving and fixed electrodes of an electrostatic, gap-closing actuator from coming into contact with each other, thereby preventing any contact stiction from developing between the electrodes and facilitating extending the lifetime of the actuator. For example, in the embodiment depicted in FIGS. 4-5, a protrusion 512 may be provided to interface with a corresponding protrusion 510 that limits the travel of the multi-stage spring 400 towards the closed position. The location and geometry of the protrusions 510, 512 are illustrative only and many other geometries and configurations may be utilized to limit the travel of the multi-stage spring 400.

Thus, embodiments of multi-stage spring assemblies that provide variable spring compliance that shapes the mechanical characteristics of the spring system have been described herein. In some embodiments, the mechanical characteristics of the spring system may be shaped to conform to forces applied by an actuating means coupled to the multi-stage spring system. The multi-stage spring system may offer different compliant levels at different deflection locations. In a non-limiting example, the multi-stage spring system may be utilized to provide a compact, high-density, low-voltage MEMS switch. For example, the multi-stage spring system can be used as part of, or in conjunction with, a MEMS parallel-plate actuator (e.g., an electrostatic gap-closing actuator) for various applications, including RF switches. The multi-stage spring system may advantageously provide higher contact-breaking forces in such a MEMS switching device.

While the foregoing is directed to embodiments of the present invention, other and further embodiments of the invention may be devised without departing from the basic scope thereof, and the scope thereof is determined by the claims that follow.

The invention claimed is:

1. A multiple-stage spring system, comprising:
a spring assembly comprising a first resilient element comprising a cantilevered beam with a free end, a second resilient element comprising a cantilevered beam with a free end, and a third resilient element extending from the first resilient element and having a contact end for contacting a contact surface, wherein:
there is a first gap between the first resilient element and the second resilient element,
there is a second gap between the contact end of the third resilient element and the contact surface, and
the spring assembly has a first spring constant when the first resilient element is deflected up to a first distance through the first gap bringing the first resilient element into contact with the second resilient element, a greater, second spring constant when the first resilient element is further deflected beyond the first distance and up to a second distance causing the third resilient element to move through the second gap such that the contact end of the third resilient element contacts the contact surface, and a greater, third spring constant when the first resilient element is still further deflected beyond the second distance after the contact end of the third resilient element contacts the contact surface and up to a third distance, and wherein the spring assembly stores mechanical energy that biases the spring assembly away from the contact surface when released.

2. The system of claim 1, further comprising:
a stop configured to limit the deflection of the spring assembly.

3. The system of claim 1, further comprising an actuator coupled to the spring assembly.

4. The system of claim 3, wherein the actuator is an electrostatic actuator.

5. The system of claim 3, wherein the actuator comprises at least one of a comb drive or a gap closing actuator.

6. The system of claim 3, wherein the actuator comprises an angled gap closing actuator, a partitioned MEMS actuator, or a multi-stage actuator.

7. The system of claim 3, wherein the spring assembly stores mechanical energy that corresponds to the force applied by the actuator.

8. The system of claim 1, wherein the resilient element comprises silicon.

9. The system of claim 1, wherein the contact end of the third resilient element comprises a tip configured to wipe the contact surface upon continued deflection of the first resilient element after the contact end contacts the contact surface.

10. The system of claim 9, wherein the tip comprises a metal.

11. The system of claim 9, wherein the tip comprises at least one of copper, aluminum, gold, rhodium, or palladium.

12. The system of claim 9, wherein the tip is configured to contact two contact surfaces disposed in a spaced apart relation.

13. The system of claim 12 further comprising:
a mechanism for facilitating rotation of the tip upon contact with the two contact surfaces.

14. The system of claim 13, wherein the mechanism comprises at least one of a hinge, a flexure, or a spring.

15. The system of claim 12, wherein the two contact surfaces and the tip are electrically conductive and at least partially define an electrical switch.

16. The system of claim 1, wherein at least one of the first spring constant is substantially constant for deflection of the first resilient element over the first distance, the second spring constant is substantially constant for deflection of the first resilient element from the first distance to the second distance, and the third spring constant is substantially constant for deflection of the first resilient element from the second distance to the third distance.

17. The system of claim 1, wherein:
the first spring constant is a spring constant of the first resilient element,
the second spring constant is a combination of the spring constant of the first resilient element and a spring constant of the second resilient element, and
the second spring constant is greater than the first spring constant.

18. The system of claim 17, wherein:
the third spring constant is a combination of the spring constant of the first resilient element, the spring constant of the second resilient element, and a spring constant of the third resilient element, and
the third spring constant is greater than the second spring constant.

19. The system of claim 18, wherein:
the first resilient element but not the second resilient element or the third resilient element deflects when the first resilient element deflects up to the first distance,
the second resilient element but not the third resilient element deflects when the first resilient element deflects beyond the first distance up to the second distance, and the third resilient element deflects when the first resilient element deflects beyond the second distance up to the third distance.

20. The system of claim 1, wherein at least one of the first resilient element, the second resilient element, and the third resilient element is a linear spring, and at least another of the first resilient element, the second resilient element, and the third resilient element is a non-linear spring.

21. The system of claim 1, wherein the cantilevered beam of the first resilient element, the cantilevered beam of the second resilient element, and the contact surface are substantially parallel.

22. The system of claim 21, wherein the third resilient element extends from the first resilient element at an angle that is neither substantially parallel nor substantially perpendicular to the first resilient element, the second resilient element, or the contact surface.

* * * * *